United States Patent
Schulien et al.

[11] 3,939,716
[45] Feb. 24, 1976

[54] ACCELEROMETER WITH LIQUID HYDROSTATIC GIMBAL SUPPORT

[75] Inventors: Howard E. Schulien, Montville; William H. Ficken, Berkeley Heights; Robert J. Sgambati, Secaucus, all of N.J.

[73] Assignee: The Bendix Corporation, Teterboro, N.J.

[22] Filed: July 17, 1974

[21] Appl. No.: 489,210

[52] U.S. Cl. ............................................. 73/516 R
[51] Int. Cl.² ........................................ G01P 15/08
[58] Field of Search... 73/515, 516 R, 517 B, 517 A

[56] References Cited
UNITED STATES PATENTS

| | | |
|---|---|---|
| 2,958,137 | 11/1960 | Mueller.......................... 73/516 R X |
| 3,509,774 | 5/1970 | Evans.................................. 73/515 |
| 3,513,710 | 5/1970 | Bates et al. ...................... 73/515 X |
| 3,766,787 | 10/1973 | Irvine............................... 73/516 R |

*Primary Examiner*—James J. Gill
*Attorney, Agent, or Firm*—Anthony F. Cuoco; S. H. Hartz

[57] ABSTRACT

An accelerometer has a liquid hydrostatic gimbal support. A pump is provided for circulating the liquid and a bellows allows for its thermal expansion. A sealed housing contains a pendulous mass and associated gimbal support geometry, and a pickoff and torquer are arranged in closed loop configuration, with the torquer current being indicative of an acceleration input.

4 Claims, 10 Drawing Figures

ACCELEROMETER WITH LIQUID HYDROSTATIC GIMBAL SUPPORT

BACKGROUND OF THE INVENTION

1. Field of the Invention

This invention relates generally to accelerometers and particulary to accelerometer gimbal support means. More particularly, this invention relates to a closed loop pendulous type accelerometer having liquid hydrostatic gimbal support means.

2. Description of the Prior Art

Prior art accelerometers have been of the liquid floated type. Accelerometers of this type require neutral buoyancy and a centering arrangement. Moreover, the density of the liquid is a critical parameter. An accelerometer with a liquid hydrostatic gimbal support as described by the present invention eliminates these requirements and, further, allows more rigid construction for reduced distortion since neutral buoyancy is not a consideration. Additionally, the accelerometer herein described is more economical to manufacture since the non-critical liquid density permits the use of self-cleaning liquids for reduced buildup and teardown time as may be required.

SUMMARY OF THE INVENTION

This invention comtemplates an accelerometer arrangement including a pump which circulates a working liquid, a bellows which allows for thermal expansion of the liquid, and a sealed housing containing a pendulous mass and including a sleeve and stepped end plates which establish gimbal support geometry. The liquid is pumped into the sleeve, and flows through rows of radially directed orifices, past the stepped end plates and into bearing gaps to provide lift for the gimbal, both axially and radially. The liquid leaves the sleeve at the end plate I.D., and therefrom returns to the pump. A pickoff and a torquer are interconnected so that the pickoff excites the torquer and the torquer current is an indication of input acceleration.

One object of this invention is to provide an accelerometer with a liquid hydrostatic gimbal support, and thereby having distinct advantages over floated accelerometers now known in the art.

Another object of this invention is to provide an accelerometer of the type described wherein liquid density is not critical.

Another object of this invention is to provide an accelerometer having a liquid hydrostatic gimbal support which is more economical to manufacture than floated accelerometers now known in the art since self-cleaning liquids may be used.

Another object of this invention is to provide an accelerometer of the type described which may be of more rigid construction for reduced distortion since neutral buoyancy is not a consideration.

These and other objects and features of the invention are pointed out in the following description in terms of the embodiment thereof which is shown in the accompanying drawing. It is to be expressly understood however, that the drawing is for illustration purposes only and is not to be construed as defining the limits of the invention.

DESCRIPTION OF THE INVENTION

Figure 1:
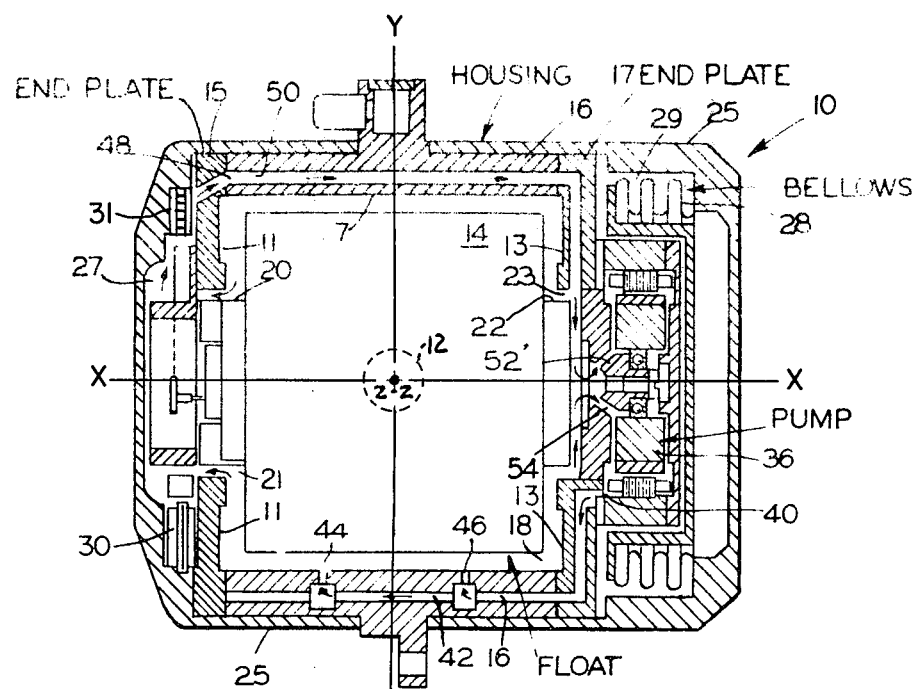
FIG. 1 is a sectional end view of an accelerometer utilizing hydrostatic gimbal support means according to the invention.

Referring first to FIG. 1, reference numeral 10, indicates a pulsed integrating pendulum (PIP) accelerometer having an output axis X—X, and input axis Y—Y and a pendulous reference axis Z—Z.

Axes X—X, Y—Y and Z—Z are mutually perpendicular as shown in the drawing. A pendulous mass 12 of conventional type is mounted for pendulousity about axis X—X. A cylindrical housing 16 is formed as a sleeve having end plates 15 and 17 so as to define a substantially cylindrical chamber 18 in which is mounted a gimbal element or float 14 of accelerometer 10. End plates 15 and 17 have annular steps or grooves 11 and 13, respectively. Gimbal 14 is positioned within chamber 18 in a slightly spaced relation to side wall surfaces of housing 16 and end plates 15 and 17 defining chamber 18 so as to provide a hydrostatic bearing means for gimbal 14 as will be hereinafter more fully described.

Gimbal 14 further includes at opposite end portions thereof axially projecting cylindrical shaft portions 20 and 22 having surfaces defining recesses 21 and 23 formed at end plates 15 and 17 of housing 16.

A casing 25 encloses housing 16 and has at one end a chamber 29 having an expansion bellows 28 mounted therein to accommodate thermal expansion of the liquid. Mounted in chamber 29 in spaced relation to bellows 28 is a compact pump 36. Pump 36 is shown to be of the spiral groove viscous shear type, but may be replaced by any other type pump such as a reciprocating pump which meets the size, output, power consumption, life requirements and other characteristics of the application described.

An opposite end chamber 27 of casing 25 has mounted therein a suitable electronic pickoff device indicated generally by the numeral 30 and a torquing device indicated generally by the numeral 31. Pickoff 30 and torquer 31 each have displaceable elements operably connected to shaft portion 20 of gimbal 14. Electronic pickoff device 30 is electrically connected so as to provide electrical signals in a conventional manner indicative of the angular position of gimbal 14. Torquer 31 is excited in closed loop fashion as shown in the block diagram of FIG. 4 to be later described. The torquer current is in indication of the acceleration input to the accelerometer of the invention.

Pump 36 includes an outlet port 40 which leads to a longitudinally extending fluid pressure channel 42 provided in housing 16. Fluid pressure channel 42, in turn, opens at ports 44 and 46 into cylindrical space 18. Liquid flows through space 18 into bearing recesses 21 and 23; flows from recess 23 into pump inlet ports 52 and 54; from recess 21 through a port 48 leading to a longitudinally extending channel 50 in housing 16; and through the I.D. of end plate 17 to pump inlet ports 52 and 54. The direction of liquid flow is indicated by arrows in FIG. 1.

Figure 2A:
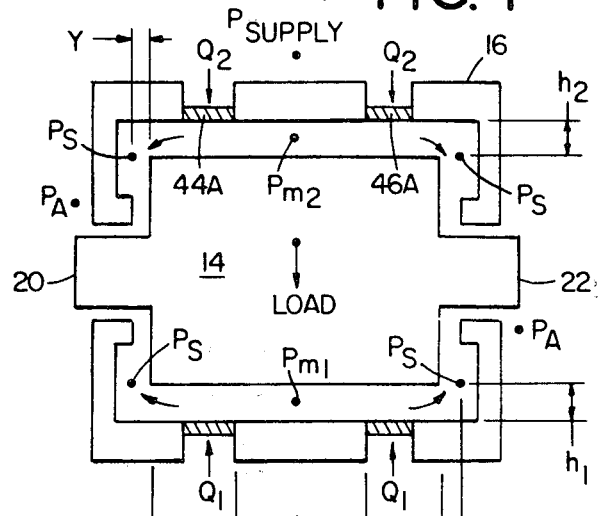
FIGS. 2A – 2B are diagrammatic representations showing radial bearing function accomplished according to the invention.

Thus, the liquid circulated by pump 36 provides both axial and radial lift for accelerometer gimbal 14. Radial lift is accomplished as shown in FIG. 2A wherein $P_A$ equals ambient pressure; $P_s$ equals step pressure; $P_m$ equals manifold pressure; h equals radial gap; Q equals liquid volume flow rate; $R_m$ equals the resistance of resistors 44A and 46A, which may be millipore filters, for restricting the flow of liquid through ports 44 and 46; $R_h$ equals radial gap flow resistance Y equals the axial gap and $R_y$ equals axial group flow resistance.

Figure 2B:
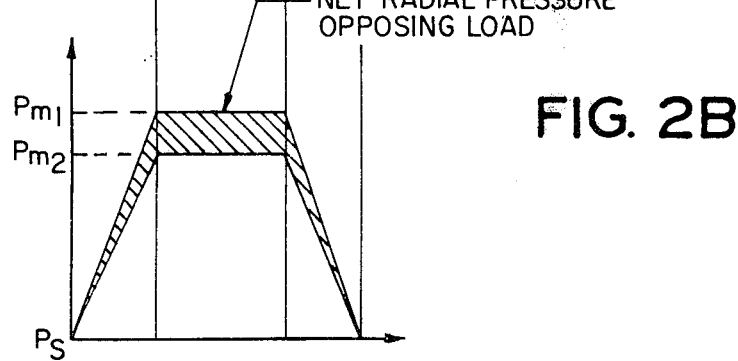

As the load is applied, Gimbal 14 is deflected downward increasing radial gap $h_2$ and decreasing radial gap $h_1$. The laminar flow through the upper restrictors is increased while the flow through the lower restrictors is decreased. As shown in FIG. 2B, this results in an increase in the lower manifold pressure ($P_{m_1}$) and a decrease in the upper manifold pressure ($P_{m_2}$) producing a net upward thrust opposing the applied load.

Figure 2C:
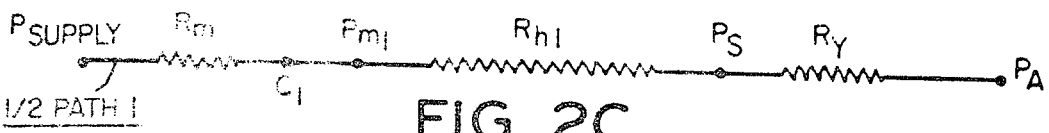
Figure 2D:
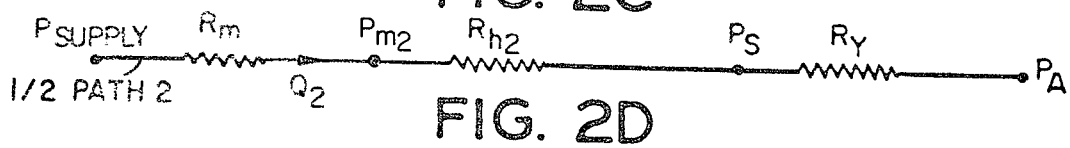

A liquid flow analogy, using equivalent resistances, as shown in FIGS. 2C and 2D may be made as follows:

$$h_2 > h_1 \tag{1}$$

$$R_h = f\left[\frac{1}{h^3}\right] \tag{2}$$

$$\therefore R_{h_1} > R_{h_2} \tag{3}$$
$$Q_1 < Q_2 \tag{4}$$
$$P_m = P_{supply} - QR_m \tag{5}$$

therefore:

$P_{m_1} > P_{m_2}$, and net radial thrust is developed.

Figure 3A:
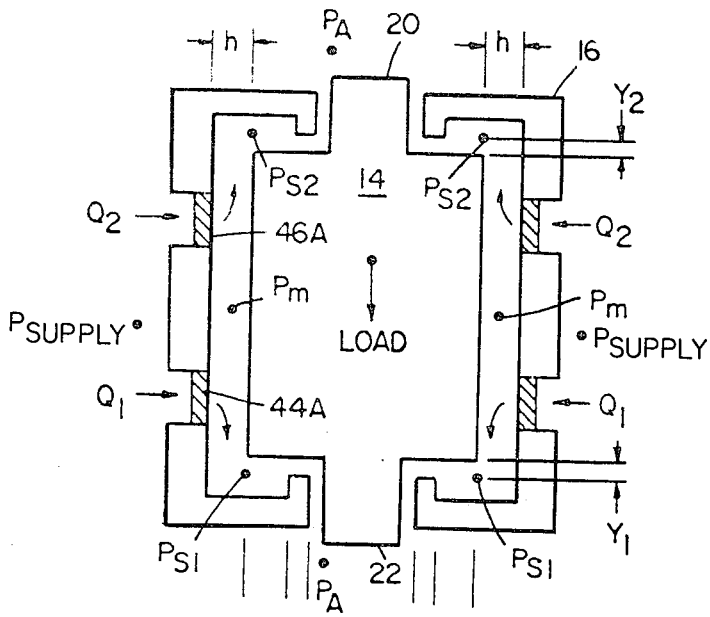
FIGS. 3A – 3D are diagrammatic representations showing axial bearing function accomplished according to the invention.

The axial lift function is shown schematically in FIG. 3A, wherein $P_A$ = ambient pressure; $P_s$ = step pressure; $R_m$ = restrictor flow resistance, $Q$ = liquid volume flow rate, $R_h$ = radial gap flow resistance, $R_y$ = axial gap flow resistance, $Y$ = axial gap and $h$ = radial gap.

Figure 3B:
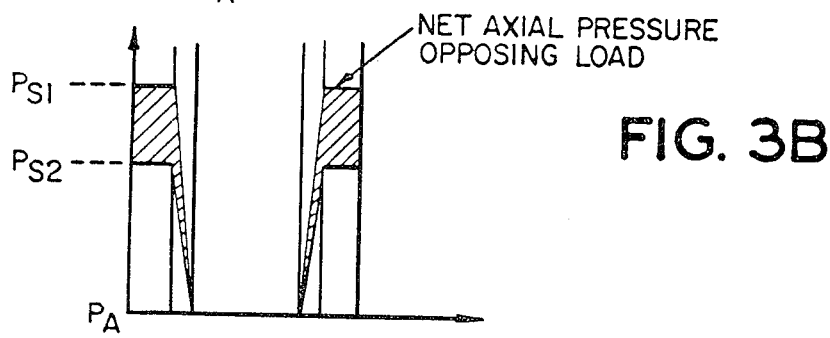

As the load is applied, $Y_2$ becomes larger than $Y_1$ causing an increase in $Q_2$ and a decrease in $Q_1$. Both $Q_1$ and $Q_2$ flow through equal radial gaps, assuming zero radial load and zero radial eccentricity. Thus, $P_{s1}$ becomes larger than $P_{s2}$, and a net thrust opposing the applied load is provided as shown in FIG. 3B.

Figure 3C:
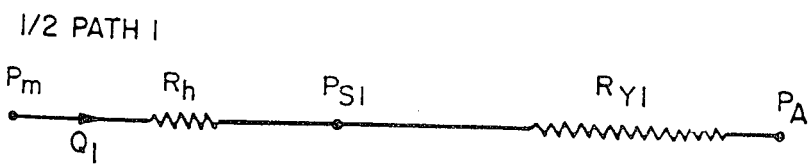
Figure 3D:
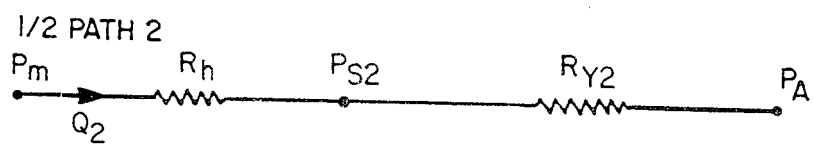

Flow anology may be made by using equivalent resistances as shown in FIGS. 3C, 3D as follows:

$$Y_2 > Y_1 \tag{6}$$

$$R_y = f\frac{1}{y^3} \tag{7}$$

$$\therefore R_{y_1} > R_{y_2} \tag{8}$$
$$Q_1 < Q_2 \tag{9}$$
$$P_s = P_m - QR_y \tag{10}$$

Therefore:

$P_{s1} > P_{s2}$, and net thrust is developed.

It will be understood that the liquid medium used for the hydrostatic bearing of the invention may be a material such as trichlorotrifluorethene commercially available as freon E2 or E4, or freon TF.

It is to be noted that in the foregoing respects the device of the invention is similar to commonly assigned U.S. Pat. No. 3,803,924 issued on Apr. 16, 1974 to Schulien, et al.

Figure 4:
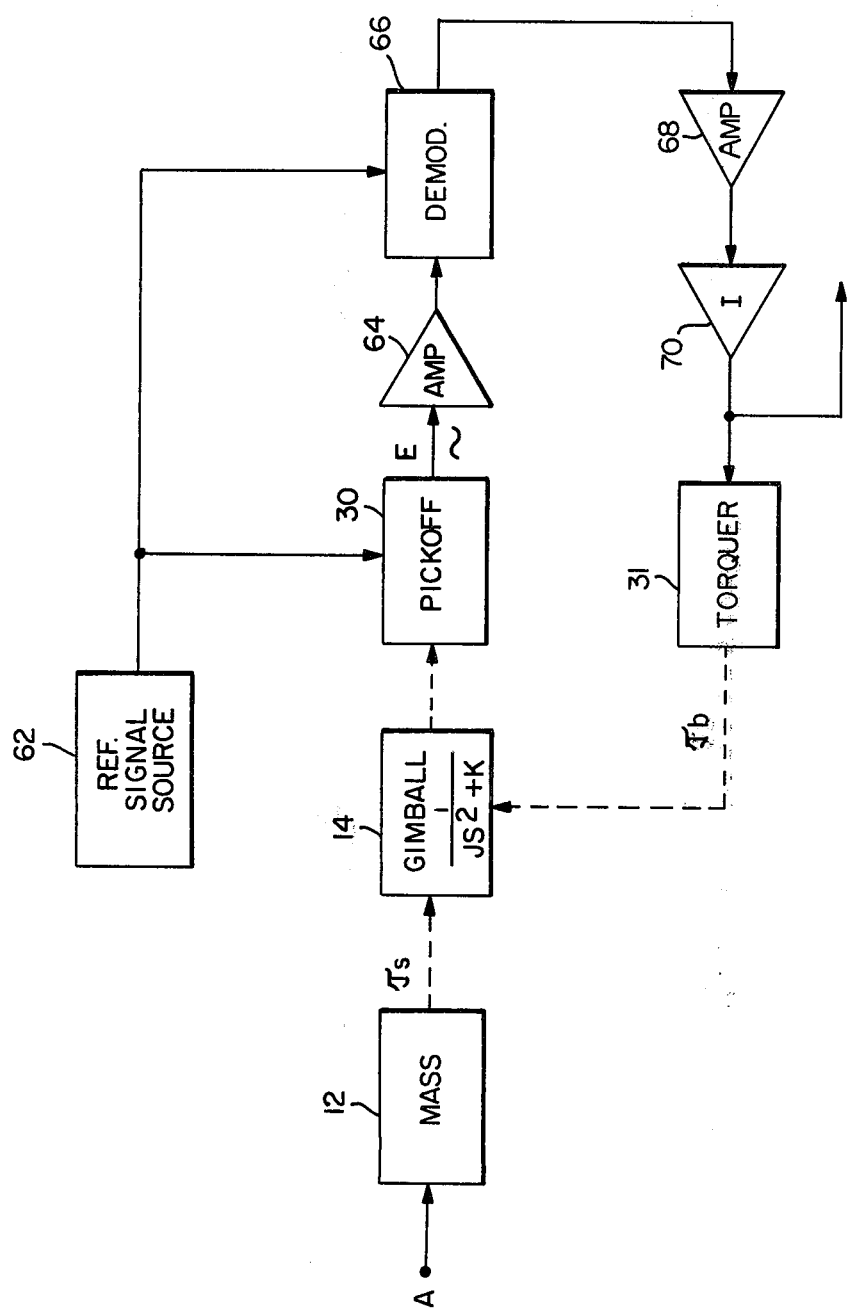
FIG. 4 is a block diagram of a system incorporating the invention.

With reference now to FIG. 4, mass 12 senses an acceleration A and responds thereto by providing a torque $\tau_s$ which is applied to gimbal 14 having dynamic characteristics as indicated in the drawing and summed thereat with a balancing torque $\tau_b$ provided by torquer 31 as will be hereinafter explained so that the gimbal is angularly displaced by the summation torque.

The angular displacement of gimbal 14 is sensed by pickoff 30, energized by a signal from a reference signal source 62, for providing a corresponding alternating signal E. Signal E is applied to a buffer amplifier 64 and therefrom to a demodulator 66, energized by the signal from reference signal source 62. Demodulator 66 provides a constant level voltage corresponding to the angular displacement of gimbal 14.

The output from demodulator 66 is applied to a stabilizing amplifier 68 and therefrom to a current amplifier 70. The output from current amplifier 70, which is indicative of the sensed acceleration, may be applied to a suitable display or indicating device (not shown) as is well known in the art. The current is applied to torquer 31 which provides torque $\tau_B$ for summation at gimbal 14 with torque $\tau_S$ as heretofore noted.

It will now be seen from the aforegoing description of the invention that an accelerometer has been provided with a liquid hydrostatic gimbal support. A pump circulates the liquid and a bellows allows for thermal expansion of the liquid, with a pendulous mass being contained in a sealed housing, and which housing also contains associated gimbal support geometry. A pickoff and torquer are arranged in closed loop configuration, with the torquer current being indicative of an acceleration input. The accelerometer of the invention has distinct advantages over floated accelerometers now known in the art in that it is more economical to manufacture because of the facility of buildup and teardown operations and may be of more rigid construction for reduced distortion.

While one embodiment of the invention has been illustrated and described, various changes in the form and relative arrangement of the parts, which will now appear obvious to those skilled in the art may be made without departing from the spirit and scope of the invention.

What is claimed is:

1. An accelerometer including a liquid hydrostatic bearing system, comprising:

a sleeve and a pair of opposite end plates having annular grooves and surfaces defining recesses, said sleeve and end plates arranged to provide a substantially cylindrical chamber;

a float disposed within the chamber in slightly spaced relation to the sleeve and end plates and including shaft members at opposite ends thereof disposed in spaced relation to the corresponding recesses defined by end plate surfaces, said space between the chamber and float and shaft members and recesses being both axial and radial;

a pendulous mass supported by the float relative to mutually perpendicular accelerometer input, output and pendulous reference axes for pendulousity about the output axis in response to a sensed acceleration;

the chamber including at least two longitudinally extending channels and radially disposed ports at opposite ends of the float connecting one of said channels with the space;

a casing surrounding the chamber and including opposite end sections;

a pump mounted in one of the end sections and including outlet ports open to the one channel and inlet ports open to the other channel, a connecting port, and the pump being effective for pumping a liquid from the pump outlet ports through the connecting port, channel and space to the pump inlet ports to provide axial and radial lift for the float; and a pickoff and torquer operably connected to the float shaft member and being supported in the other of the end sections, and means electrically connecting the pickoff and torquer, with the torquer current being indicative of the sensed acceleration.

2. An accelerometer as described by claim 1, including:

the float being deflected in one sense to increase the radial space in the one sense and to decrease the radial space in the opposite sense upon application of a load;

laminar liquid flow through the ports being thereupon increased in the one sense and decreased in the opposite sense;

restrictor means for restricting liquid flow through the radial ports; and a net radial pressure in the one sense for opposing the applied load being applied in accordance with the equation:
$$P_m = P_{supply} - QR_m,$$
where $P_m$ is the net radial pressure, $P_s$ is the pressure on the annular grooves, Q is liquid volume flow rate and $R_m$ is the restrictor means flow resistance.

3. A system as described by claim 1, wherein the float is deflected in one sense to increase the axial space in the one sense and to decrease the axial space in the opposite sense upon application of a load;

laminar liquid flow through the port at the end of the float near the increased axial space being increased and flow through the port at the end of the float near the decreased axial space being decreased; and a net axial pressure on the annular groove in the one sense for opposing the applied load being applied in accordance with the equation:
$$P_s = P_m - QR_y,$$
where $P_s$ is the net annular groove pressure $P_m$ is the net radial pressure opposing the applied load, Q is liquid volume flow rate and $R_y$ is axial space flow resistance.

4. An accelerometer as described by claim 1, wherein:

the pendulous mass is responsive to the sensed acceleration for providing a first torque which is applied to the float;

the means electrically connecting the pickoff and torquer provides a current to drive the torquer to provide a second torque which is applied to the float; and the float is angularly displaced in response to the summation of the first and second torques.

* * * * *